(12) United States Patent
Wilhelm

(10) Patent No.: US 8,346,769 B2
(45) Date of Patent: Jan. 1, 2013

(54) SYSTEM, METHOD AND PROGRAM TO MANAGE ALTERNATE BOOKMARKS

(75) Inventor: Robert D. Wilhelm, Cheyenne, WY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 13/423,839

(22) Filed: Mar. 19, 2012

(65) Prior Publication Data

US 2012/0179974 A1 Jul. 12, 2012

Related U.S. Application Data

(63) Continuation of application No. 11/431,685, filed on May 9, 2006, now abandoned.

(51) Int. Cl.
*G06F 7/00* (2006.01)
*G06F 17/30* (2006.01)

(52) U.S. Cl. .................... 707/736; 707/782; 707/912

(58) Field of Classification Search .............. 707/705, 707/736, 781, 782, 912
See application file for complete search history.

(56) References Cited

U.S. PATENT DOCUMENTS

| | | | |
|---|---|---|---|
| 6,088,707 A | 7/2000 | Bates et al. | |
| 6,209,036 B1* | 3/2001 | Aldred et al. | 709/229 |
| 6,535,912 B1 | 3/2003 | Anupam et al. | |
| 6,895,430 B1 | 5/2005 | Schneider | |
| 7,136,896 B1* | 11/2006 | Srinivas et al. | 709/203 |
| 7,631,084 B2* | 12/2009 | Thomas et al. | 709/227 |
| 2003/0191737 A1* | 10/2003 | Steele et al. | 707/1 |
| 2004/0034637 A1* | 2/2004 | Riche et al. | 707/9 |
| 2004/0107296 A1 | 6/2004 | Donker et al. | |
| 2006/0059225 A1 | 3/2006 | Stonehocker et al. | |
| 2007/0282802 A1 | 12/2007 | Wilhelm | |

FOREIGN PATENT DOCUMENTS

| | | |
|---|---|---|
| JP | 2004-110206 | 4/2004 |
| WO | 03/036968 A1 | 5/2003 |

OTHER PUBLICATIONS

Amazon.com, http://web.archive.org/web/19991013091817/http://amazon.com/, Oct. 13, 1999 (2 pages).

Zhang et al., "Supporting Virtual Documents in Just-in-Time Hypermedia Systems" ACM, 2004, publication No. ACM 1-58113-938, pp. 35-44.

Weinreich et al., "Concepts for Improved Visualization of Web Link Attributes" published by University of Hamburg, Germany. http://www9.org/w9cdrom/319/319.html, 16 pages.

(Continued)

*Primary Examiner* — Marc Somers
(74) *Attorney, Agent, or Firm* — Arthur J. Samodovitz

(57) ABSTRACT

System, method and program for managing bookmarks. A user hovers a cursor over a primary bookmark displayed on a client computer. In response, the client computer automatically sends a request to a server corresponding to the primary bookmark to identify one or more alternate bookmarks that correspond to the primary bookmark. In response to receipt of the identification of the one or more alternate bookmarks from the server, the client computer displays the one or more alternate bookmarks adjacent to the primary bookmark. If a user selects one of the alternate bookmarks which is displayed, the client computer sends a request to a web server corresponding to the selected alternate bookmark for a web page corresponding to the selected alternate bookmark.

25 Claims, 5 Drawing Sheets

OTHER PUBLICATIONS

Mukherjee et al. "Browsing Fatigue in Handhelds: Semantic Bookmarking Spells Relief" ACM 1-59593-045, Japan, 2005, pp. 593-602.

Duri et al., "An Approach to Providing a Seamless End-User Experience for Location-Aware Applications" Proceedings of the First International Workshop on Mobile Commerce, New York, NY, 2001, pp. 20-25.

Chen et al., "A Distributed Multi-Agent System for Collaborative Information Management and Sharing", Proceedings of the 9th International Conference on Information and Knowledge Management, New York, NY, 2000, pp. 382-388.

Jung et al., "Collaborative Web Browsing Based on Ontology Learning From Bookmarks", Computational Science—ICCS 2004, 4th International Conference Proceedings, Berlin, Germany, 2004 (Abstract Only).

http://mozilla.com/firefox/livebookmarks (1 page), accessed/viewed Mar. 9, 2006.

Tsandilas et al., "User-Controlled Link Adaptation", ACM 1-58113-704-4, Nottingham, UK, 2003, pp. 152-160.

* cited by examiner

SYSTEM, METHOD AND PROGRAM TO MANAGE ALTERNATE BOOKMARKS

CROSS REFERENCE TO RELATED APPLICATION

This application is a continuation of co-pending U.S. Ser. No. 11/431,685, filed May 9, 2006 which published Dec. 6, 2007, as U.S. Patent Publication No. 20070282802 A1.

FIELD OF THE INVENTION

The present invention relates generally to the World Wide Web, and more specifically to web browser "bookmarks".

BACKGROUND OF THE INVENTION

The Internet is well known today, and comprises a vast multitude of communication media, Internet Service Providers, firewalls, routers, network switches, etc. Client computers are connected to web servers via the Internet. Web servers host "web sites" to provide information to users at the client computers and also provide an interface to applications hosted at the web server. A web site typically comprises multiple web pages and web files. Each web page and web file has a unique Universal Resource Locator ("URL") used by the client computer to address the web page or web file. A web page typically includes hyper links, corresponding to other web pages or web files, to facilitate user selection of the web page or web file. Thus, when a user at a client computer with a web browser enters a URL or selects a hyper link (representing a URL) from a web page, the web browser sends a request to the web server which hosts the web page or web file addressed by the URL. The web server then returns the web page or web file to the client computer (in HTML for a web page, FTP for web file, or other such form), and the web browser renders and initiates display of the web page or web file on the client computer. The user can obtain information from the web page or web file or use the web page to interface an application hosted on the web server, such as an application to electronically purchase a product listed on the web page.

Known web browsers also define and display "bookmarks" (also known as "hot lists" or "Favorites") comprised of hyperlinks in a list. The web browser typically displays the bookmarks in a pull-down menu. Bookmarks may also be displayed on a web browser bookmarks toolbar. A bookmark can be a name (such as a subject or description) of a web page or web file. The name associated with each web page or web file comes from an existing "<title>" markup tag in the HTML code by default. A bookmark can also be the actual URL of the web page or web file, if no name or description of the web page or web file is available. A bookmark name may also be modified by the user to be a name of the user's choosing or the bookmark name may be modified to be blank. In either case, the web browser also stores the URL corresponding to the displayed bookmark as the "target" of the bookmark. Each bookmark is a hyper link for a corresponding web page or web file, and when selected by a user, will cause the client computer to request the corresponding web page or web file from the web server that hosts the web page or web file. The bookmarks may represent web pages or web files that the user frequently requests, are important to the user, or the user does not want to forget for one reason or other. To create a bookmark, the user can enter the URL into the bookmark list by typing the URL, or more commonly, by indicating to the web browser that the URL of a web page or web file currently being displayed should be added to the bookmark list. In the latter case, the web browser will display as a bookmark the name (or URL, if no name is known) of the web page currently being displayed, and store the corresponding URL as well.

It was known that when a mouse cursor hovers over a certain type of hyper link (i.e. a "mouse-over"), the web browser may display the URL of the hyper link in a status bar below the web page. A publication entitled "Concepts for Improved Visualization of Web Link Attributes" (HyperScout) by Harald Weinreich and Winfried Lamersdorf, published by University of Hamburg, Germany (more than one year ago), discloses a method for displaying additional hyper link information to a user.

It was also known that when a mouse cursor hovers over a certain type of bookmark, the web browser will request additional information from the web site corresponding to the bookmark, and display the additional information next to the bookmark. A Mozilla® "Live Bookmarks" program feature of Mozilla® Firefox® web browsers provides dynamic bookmarks which retrieve dynamic information, such as news headlines from the bookmarked web site. Mozilla® and Firefox® are registered trademarks of Mozilla Foundation. Another publication entitled "Browsing Fatigue in Handhelds: Semantic Bookmarking Spells Relief" by Saikat Mukherjee and I. V. Ramakrishnan, published by World Wide Web Conference Committee (IW3C2) on May 10-14, 2005, discloses semantic bookmarks that provide a conceptual framework for recording and retrieving targeted content not only from specific pages used in creating the bookmarks but also from any user-specified page with similar content semantics. A bookmark is associated with both the URL of the page as well as extraction expressions that when applied to this page will retrieve the desired content.

Another publication entitled "Supporting Virtual Documents in Just-in-Time Hypermedia Systems" by Li Zhang, Michael Bieber, David Millard and Vincent Oria, published by ACM in 2004, publication number ACM 1-58113-938-1/04/0010, discloses creation of a bookmark containing calculation results before closing a window for a sales support application used to calculate the results. Invoking each bookmark later causes the sales support application to re-execute its calculations automatically, and a just-in-time hypermedia system relocates the user's comments in the application's regenerated display. U.S. Pat. No. 6,535,912 discloses a method for creating and playing back a smart bookmark that automatically retrieves a requested web page through a plurality of intermediate web pages.

Another publication entitled "An Approach to Providing a Seamless End-User Experience for Location-Aware Applications" by Sastry Duni, Alan Cole, Jonathan Munson and Jim Christensen", published by ACM in 2001, publication number 1-58113-376-6/01/07, discloses dynamic bookmarks where a URL associated with a dynamic bookmark may vary from location to location. The application detects location changes and updates the URLs associated with dynamic bookmarks. Also, each dynamic bookmark is associated with a set of attributes that are used to find matching URLs at a given location. Finally, the process of matching dynamic bookmarks with corresponding URLs is triggered by changes in the user's location.

An object of the present invention is to facilitate navigation through a web site using bookmarks.

SUMMARY OF THE INVENTION

The present invention resides in a system, method and program for managing bookmarks. A user hovers a cursor over a primary bookmark displayed on a client computer. In response, the client computer automatically sends a request to a server corresponding to the primary bookmark to identify one or more alternate bookmarks that correspond to the primary bookmark. In response to receipt of the identification of the one or more alternate bookmarks from the server, the client computer displays the one or more alternate bookmarks adjacent to the primary bookmark. If a user selects one of the alternate bookmarks which is displayed, the client computer sends a request to a web server corresponding to the selected alternate bookmark for a web page corresponding to the selected alternate bookmark.

DETAILED DESCRIPTION OF THE PREFERRED EMBODIMENTS

Figure 1:
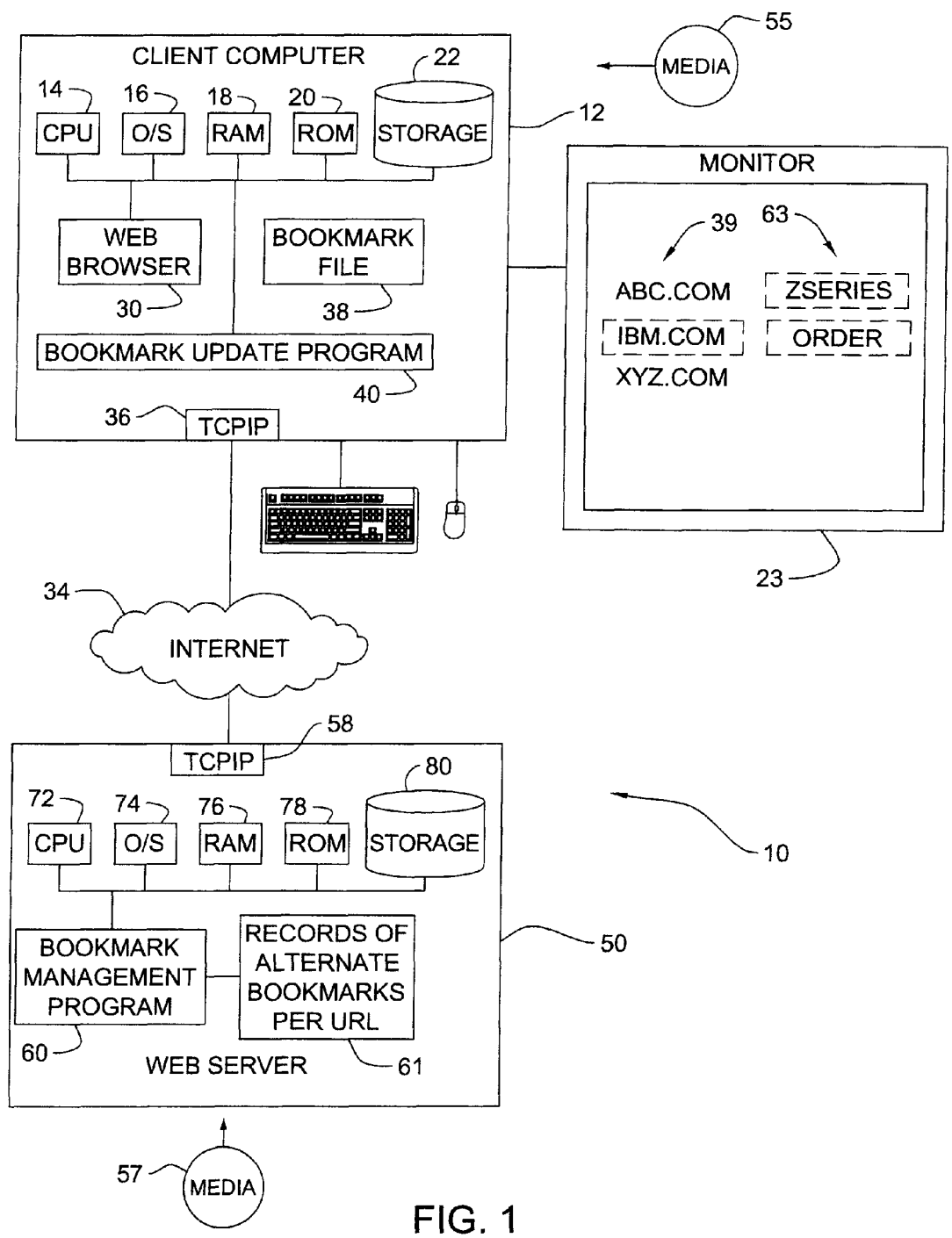
FIG. 1 is a block diagram of a distributed computer system, including a web browser program and bookmark update program in a client computer and a bookmark management program in a server computer, in which the present invention is incorporated.

The present invention will now be described in detail with reference to the figures. FIG. 1 illustrates a distributed computer system generally designated 10. System 10 includes a client computer 12 with known CPU 14, operating system 16, RAM 18, ROM 20, and storage 22 and a monitor 23. Client computer 12 is connected to Internet 34 via a TCP/IP adapter card 36. Client computer 12 also includes a web browser 30 with known functions to render and display web pages fetched from a web server 50, receive data or URL entry by a user, receive selections of hyper links (embedded in a web page, listed as a primary bookmark or listed as an alternate bookmark) by a user, and request, render and initiate display of web pages corresponding to the hyper links selected by the user. Web browser 30 maintains a bookmark file 38 which lists hyper links, and corresponding URLs of web pages or web files. The bookmarks are displayed in a pull down menu 39, when the user selects the pull down menu. The bookmarks may also be displayed on the web browser 30 bookmarks toolbar. If a user selects one of the hyperlinks, the web browser will request the corresponding web page or web file from the web server that hosts the web page or web file. The bookmark hyper link can be a name, if available, of the corresponding web page or web file. If a bookmark does not have a name, then the web browser can display the URL itself as the hyper link in the bookmark list. A user may also specify the user's own bookmark name upon creation and may also rename the bookmark at a later time. Upon receipt of an HTML or other representation of a web page or web file corresponding to a selected bookmark, the web browser will render and initiate display of the requested web page or web file.

In accordance with the present invention, if a user at client computer 12 hovers a mouse cursor for a predetermined minimum time over a bookmark, i.e. a name or URL of a web page or web file in the lists of bookmarks (shown figuratively by the highlighting of "ibm.com"), web browser 30 will detect this hovering, and notify a bookmark update program 40 within the client computer. (Program 40 can be part of web browser 30 or a separate program.) For purposes of explanation herein, the bookmarks in the pull-down menu 39 or on the bookmarks toolbar may be called "primary" bookmarks. The notification includes the identity of the primary bookmark over which the mouse cursor hovered. In response, program 40 will request from the web server (such as server 50) addressed by the primary bookmark, a list of current, "alternate" hyperlinks for the primary bookmark over which the mouse hovered. The client request will identify the identity of the primary bookmark over which the mouse hovered. Upon receipt at client computer of the current, alternate bookmarks, web browser 30 will display the current, alternate bookmarks next to the primary bookmark over which the mouse hovered to elicit the request. The user can then select any of the current, alternate bookmarks to request the corresponding web page or web file. The foregoing process gives the web server control in defining the alternate bookmarks to facilitate meaningful and valuable navigation through the web site hosted by the web server. For example, if certain web pages are currently of keen interest to the public or customer base, the web server can return these web pages to client computers as alternate bookmarks for a primary bookmark for the home page of the web site.

Server 50 includes a known CPU 72, operating system 74, RAM 76, ROM 78 and storage 80, and is connected to the Internet via a TCP/IP adapter card 58. Server 50 also includes a bookmark management program 60, according to the present invention. Program 60 maintains, for one or more of the URLs/web pages hosted by the web server 50, respective record(s) 61 (in a table or other file format) of alternate bookmarks to be displayed at a client computer in response to the client computer's request for the alternate book marks for respective primary bookmarks. In the example illustrated in FIG. 1, "zSeries.com" and "order.com", are current alternate bookmarks 63 for the primary bookmark "ibm.com", i.e. the home page of the IBM web site. (Client computer fetched these recently in response to a mouse-over of "ibm.com" primary bookmark.) The information in this record is based either on specification from an administrator of the web site or an algorithm implemented by program 60, as described below with reference to FIG. 2. For example, the "ibm.com/zSeries" web page gives information about a newly released, IBM® zSeries® server, and the "ibm.com/order" web page gives status information for pending orders placed from this client computer or user ID. IBM and zSeries are registered trademarks of International Business Machines Corporation ("IBM"). To generate the state of client computer 12 illustrated in FIG. 1, the user of client computer 12 hovered a mouse cursor over the primary bookmark "ibm.com". In response, bookmark update program 40 requested from server 50 the current, alternate bookmarks for the primary bookmark "ibm.com", and program 60 returned the list of alternate bookmarks to program 40 in client computer 12. In response, program 40 notified web browser 30 to render and initiate display of the alternate bookmarks next to the primary bookmark over which the mouse cursor hovered. (The user need only hover the mouse cursor over the primary bookmark for a minimum, predetermined time to initiate the request from program 40; the user need not continue to hover the mouse cursor over the primary bookmark for the entire time it takes to receive the list of alternate bookmarks from program 60.) Thus, programs 40 and 60 provide dynamic, alternate bookmarks, under the control of the web server identified by the primary bookmark. On a subsequent day, there is a new release of an IBM® pSeries® server and no pending orders placed by client computer 12 or by the user of client computer. IBM and pSeries are registered trademarks of International Business Machines Corporation ("IBM"). The user hovers a mouse cursor over the bookmark for the IBM home page, and program 40 requests the current alternate bookmarks. Program 60 responds with an alternate bookmark for an "IBM pSeries" web page (and no alternate bookmark for the pending order web page). Thus, according to the present invention, the web server 50 can dynamically change the alternate bookmarks for each of the primary bookmarks, based on changing conditions or preferences of the web server or the administrator of the web server. As another example, during certain months of the year, program 60 may be programmed to feature certain seasonal products of a retailer by providing, as alternate bookmarks (for a primary bookmark for the home page of the retailer), the names or URLs of web pages featuring these seasonal products. As another example, the administrator may want to feature certain products which are currently "on sale" or for which there is currently a discount coupon available at the web site, by providing as alternate bookmarks (for a primary bookmark for the home page of the retailer), the names or URLs of web pages featuring these products. (Other servers on the Internet are also equipped with a similar bookmark management program, host the web pages indicated by one or more other primary bookmarks in the pull down menu and provide the list of alternate bookmarks upon request by a client computer for display by the client computer as described above.)

Figure 2A:
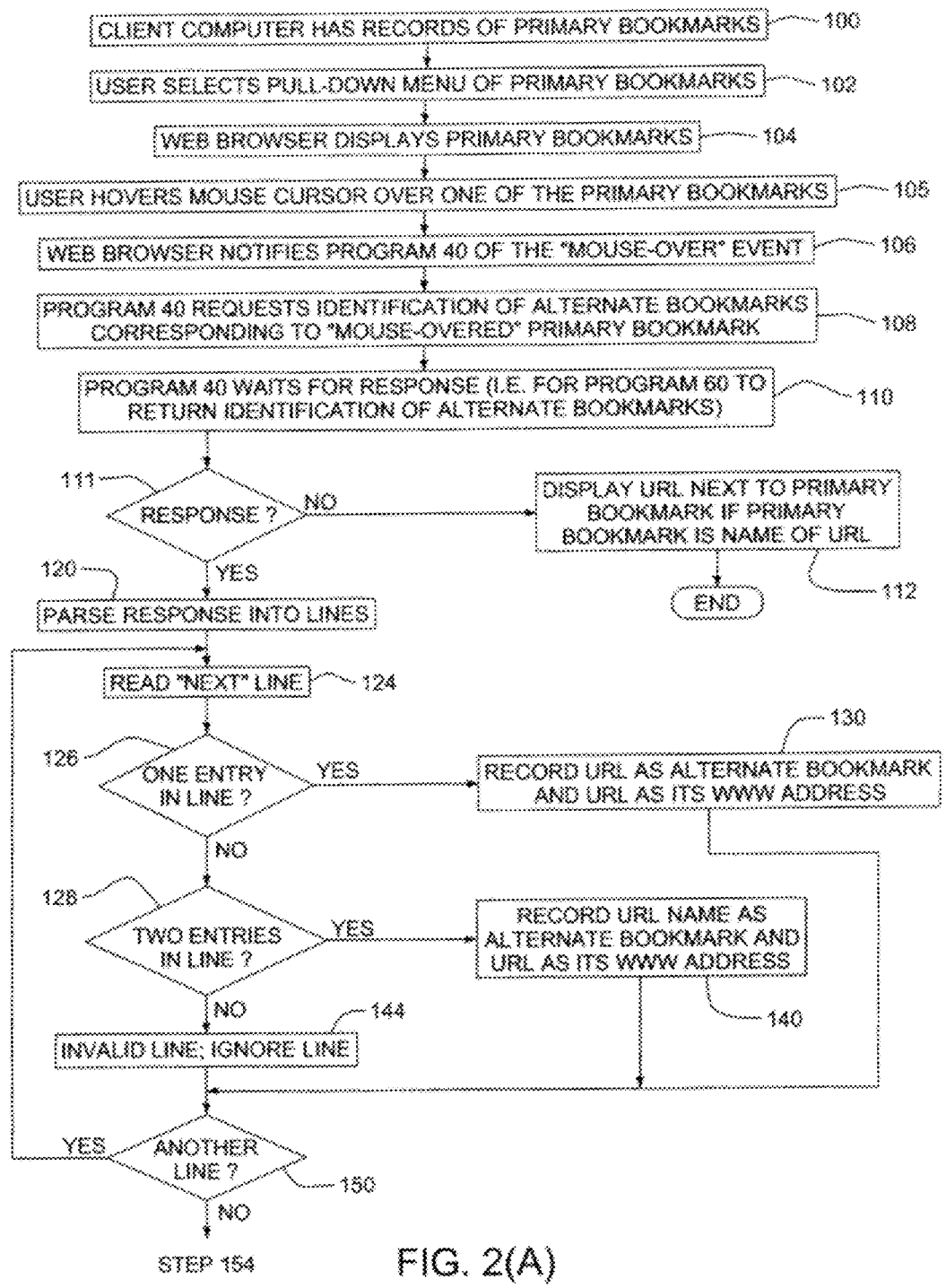
FIGS. 2(A) and 2(B) form a flow chart of the web browser and bookmark update program, and operation of the bookmark management program, of FIG. 1.
Figure 2B:
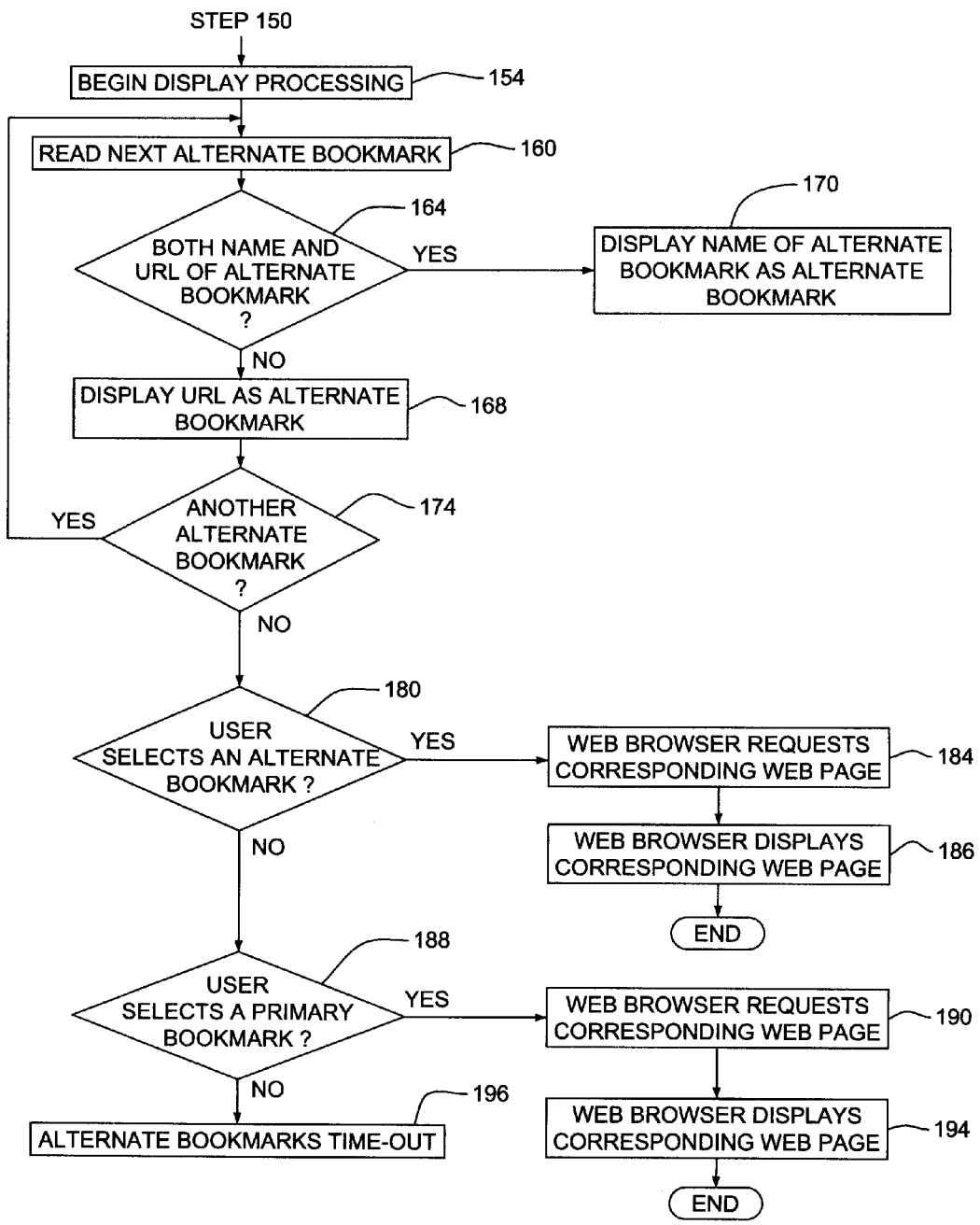

FIGS. 2(A) and 2(B) illustrate, in more detail, the web browser 30 and bookmark file update program 40, and operation of the bookmark management program 60 of FIG. 1. In step 100, the client computer has one or more primary bookmarks in bookmark file 38 and these are listed in a pull down menu 39 of bookmarks. To form the primary bookmarks, the user may have typed-in the URLs for the primary bookmarks or notified the web browser 30 that a web page currently being displayed at the client computer should be recorded and displayed as a primary bookmark. In either case, the web browser 30 stores the names of the primary bookmark, if any, and respective URLs in the bookmark file 38. Next, the user selects the pull-down menu of primary bookmarks (step 102). In response, the web browser 30 displays the list of primary bookmarks (i.e. names or URLs) in pull-down or other format (step 104). Next, the user hovers a mouse cursor over one of the primary bookmarks for a minimum predetermined amount of time (step 105). In response, web browser 30 notifies program 40 of the occurrence of the "mouse-over" of the primary bookmark, and the URL of the primary bookmark (step 106). In response, program 40 makes a GET request, to the web server corresponding to the primary bookmark over which the mouse cursor hovered, for a list of the current, corresponding alternate bookmark(s) (step 108). The GET request specifies the URL of the primary bookmark and the need for the list of its alternate bookmark(s). By way of example, the GET request can take the form of the URL of the primary bookmark with a suffix of "alternate", such as "ibm-.com/alternate" to request the alternate bookmarks for the "ibm.com" primary bookmark. By way of example, the primary bookmark which has been mouse-overed is the URL for web server 50. Next, program 40 waits for a response (decision 110) from the web server (in this example, web server 50). If program 40 does not receive a response within a predetermined time-out (decision 111, no branch), program will execute a default routine, as follows. If the primary bookmark is a name of a web page, program 40 will initiate display of the URL of the primary bookmark as the alternate bookmark (step 112). Referring again to decision 111, yes branch, where web server 50 responds with a list of alternate bookmark(s), program 40 parses the response to identify the alternate bookmark names, if any, (for display as the alternate bookmarks) and corresponding URLs (for requesting the corresponding web page) (step 120). In some cases, there will not be an alternate bookmark name, just the actual URL, in which case program 40 will identify to web browser 30 the URL alone for display as the alternate bookmark. In one embodiment of the present invention, program 60 provides its response in "lines", where each line includes the alternate bookmark name, if any and corresponding URL, or just the URL if there is no alternate bookmark name. In this embodiment of the present invention, program 40 proceeds to read and parse each line to identify if it contains both the alternate bookmark name and corresponding URL, or just the corresponding URL (step 124). If the line includes only the URL (decision 126, yes branch), then program 40 records the actual URL as the alternate bookmark and also as the corresponding URL used to request the corresponding web page; there is no alternate bookmark name (step 130). If the line includes both an alternate bookmark name and corresponding URL (decision 128, yes branch), then program 40 records the alternate bookmark name for display next to the corresponding primary bookmark, and a pointer to the actual URL used to request the corresponding web page when the user selects the alternate bookmark name (step 140). If there are zero items or more than two items in the line (decision 128, no branch), then this represents an invalid condition, and no alternate bookmark is gleaned from this line (step 144). Next, program 40 determines if there is another line to read from the response from program 60 (decision 150). If so (decision 150, yes branch), then program 40 loops back to step 124 to repeat steps 124-144 for this next line. When all the lines have been read (decision 150, no branch), then program 40 begins the process of notifying web browser 30 to render and initiate display of the alternate bookmarks (either the names or URLs) (step 154). Accordingly, in step 160 program 40 reads the next another alternate bookmark in the list identified in the iteration(s) of step 130 or 140. This should be the first, during the first iteration of step 160, unless server 50 did not return any valid alternative bookmarks. So, program 40 determines if the first alternate bookmark has been described by both an alternate bookmark name and an alternate bookmark URL or just by an alternate bookmark URL (decision 164). If server 50 has provided both (decision 164 yes branch), then program 40 notifies web browser 30 to render and initiate display of the first alternate bookmark name next to the corresponding primary bookmark (step 170). However, if server 50 has provided only the alternate bookmark URL (decision 164, no branch), then program 40 notifies web browser 30 to render and initiate display of the first alternate bookmark URL next to the corresponding primary bookmark (step 168). In the illustrated example, web browser 30 will continue to display the alternate bookmarks until the user selects a primary bookmark or alternate bookmark, hovers a mouse cursor over another primary bookmark, closes the pull-down menu, or lapse of a time-out. Next, program 40 loops back to 160 to repeat the foregoing steps 160-170 for the next alternate bookmark in the set returned by server 50 (decision 174, yes branch). Thus, when program 40 has processed all of the alternate bookmarks returned by server 50 in response to a mouse-over of the corresponding primary bookmark, web server 30 will have displayed all the alternate bookmarks in the list next to the corresponding primary bookmark. There can be one to several alternate bookmarks next to a single primary bookmark. In response to the display of the alternate bookmarks, the user can opt to select (using a mouse or keyboard) one of the alternate bookmarks which is displayed (decision 180, yes branch). If so, program 40 will determine from its records the corresponding URL, and send a request to the server identified by the corresponding URL for the corresponding web page (step 184). Upon receipt of this corresponding web page, program 40 will notify web browser 30 to render and display this corresponding web page (step 186). If instead of selecting an alternate bookmark (decision 180, no branch), the user selects any of the primary bookmarks (decision 188, yes branch), then the web browser 30 will determine from bookmark file 38 the corresponding URL, and send a request to the server identified by this corresponding URL for the corresponding web page (step 190). Upon receipt of this corresponding web page, web browser 30 will render and display this corresponding web page (step 194). Referring again to decision 188, no branch, where the user has selected neither an alternate bookmark nor a primary bookmark, nor taken any other action that will affirmatively terminate display of the alternate bookmarks, program 40 will cease to display the alternate bookmarks after a predetermined timeout (step 196).

Figure 3:
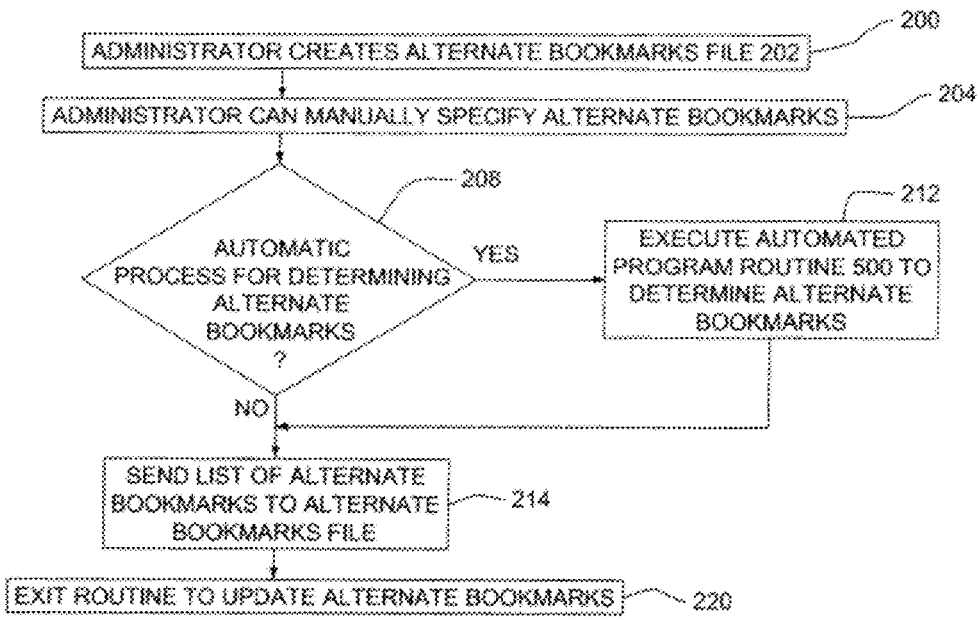
FIG. 3 is a flow chart of the bookmark management program of FIG. 1.

FIG. 3 illustrates, in more detail, the set up of bookmark management program 60 and the manual process and/or automatic algorithm by which the records 61 defining the alternate bookmarks are formed. In step 200, during setup, an administrator creates an alternate bookmark file 202 for the web site hosted by server 50. This file 202 will include a set of alternate bookmarks (one or more URLs and optional associated name descriptors) if any, for which the web site would like to display as additional target URL's in reference to the bookmarked URL. An administrator may manually update the alternate bookmarks file 202 by entering the URLs and optional name descriptor(s) for the URLS in file 202 (step 204). In other implementations, program 60 includes a program routine 500 (or script function) to automatically determine the URLs and names of these alternate bookmarks for the web site (decision 208, yes branch). In such a case, program 60 executes the program routine 500 (or script function) to determine, based on web site owner preference, the alternate bookmarks for a primary bookmark representing the web site (step 212).

Figure 4:
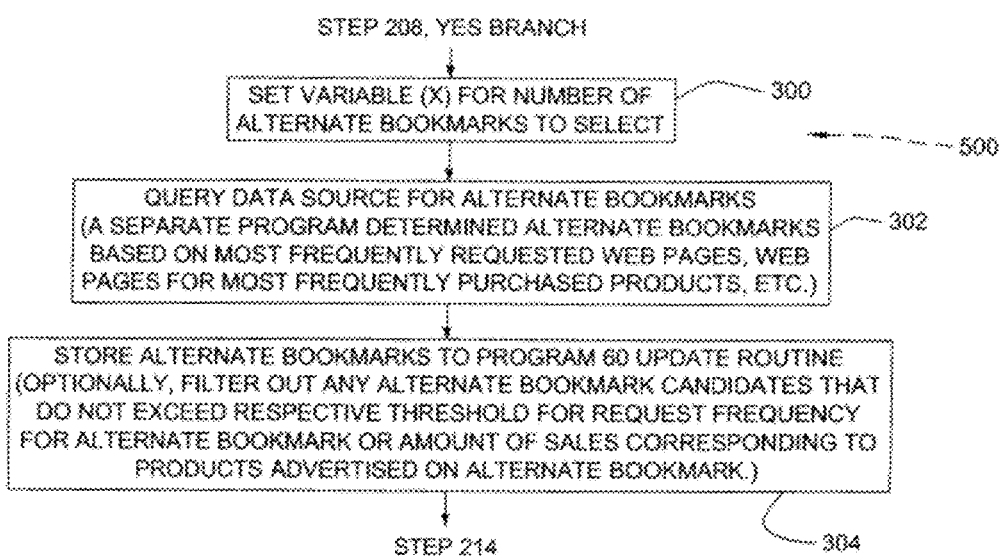
FIG. 4 is a flow chart of a program routine within the bookmark management program of FIG. 1 to automatically generate alternate bookmarks for display at the client computer.

One example of program routine 500 (or script function) executed in step 212 to identify the alternate bookmarks for the web site is illustrated in FIG. 4. In step 300, program 60 sets a variable "x" for a number of data entries to list as alternate bookmarks. Next program 60 queries a log or other record for the data entries (step 302). For example, program 60 can query a process, file or log indicating (a) which web pages received the most number of requests during the previous time interval such as an hour or day, (b) which products were the best sellers during the previous time interval such as a day, week or month. Next, program 60 stores in the alternate bookmarks file 202 the "x" number of data entries identified by the algorithm in step 302 (step 304). Optionally, in step 304, program 60 can delete any of the "x" data entries that do not exceed predetermined respective thresholds for (a) the number of requests for the web pages during the previous time interval, and (b) amount of sales of the products corresponding to the web pages.

Figure 5:
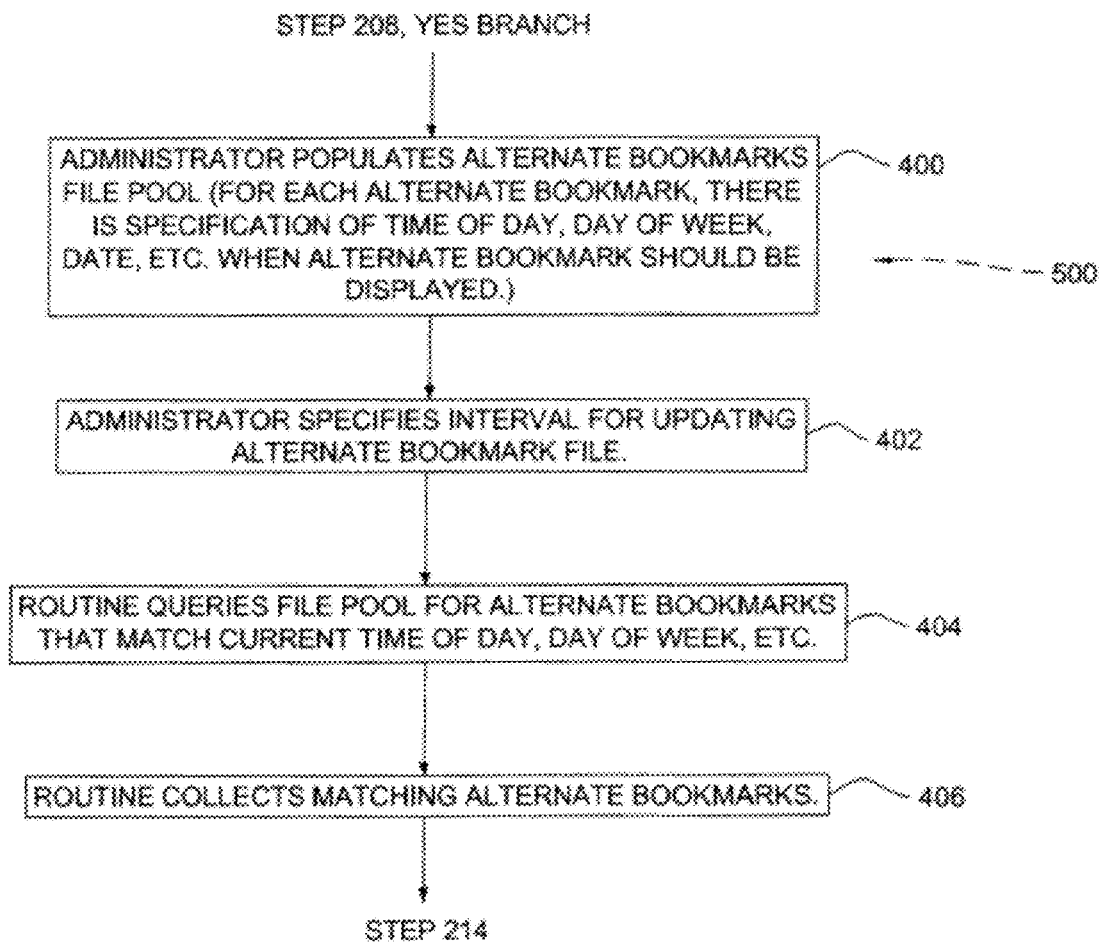
FIG. 5 is a flow chart of another program routine within the bookmark management program of FIG. 1 to automatically generate alternate bookmarks for display at the client computer.

Another example of program routine 500 (or script function) executed in step 212 to identify the alternate bookmarks for the web site is illustrated in FIG. 5. In step 400, an administrator populates a file pool of possible alternate bookmarks. The file pool specifies for each alternate bookmark its displayed name and corresponding URL or in the absence of a displayed name, its URL for display. The file pool also specifies the criteria for displaying each alternate bookmark such as the day, time of day, month, season (specified by starting and ending dates), holiday (specified by date), etc. that the respective bookmark should be displayed. In step 402, program 60 determines intervals for updating alternate bookmarks file 202, such as daily, hourly, etc. At the next interval, program 60 queries the file pool 401 for the alternate bookmarks that match the current day and time (step 404) and collects these alternate bookmarks (step 406).

Referring again to FIG. 3, next, program 60 writes resulting output from the custom algorithms and scripts, i.e. URL: Displayed Name combinations or URL only information, to the alternate bookmarks file 202 (step 214). Next, program 60 exits the automatic update routine (step 220). As explained above, during operation, a client computer (such as client computer 12) sends to web server 50 a GET request for a set of alternate bookmarks for a URL of a primary bookmark specified in the request. In response, program 60 returns a list of alternate bookmarks corresponding to the specified primary bookmark.

Program 40 can be loaded into client computer 12 from a computer readable media 55 such as magnetic tape or disk, optical disk, DVD, memory stick, etc. or downloaded from the Internet via TCP/IP adapter card 36.

Program 60 can be loaded into web server 50 from a computer readable media 57 such as magnetic tape or disk, optical disk, DVD, memory stick, etc. or downloaded from the Internet via a TCP/IP adapter card 58.

Based on the foregoing, a system, method and program for managing bookmarks have been disclosed. However, numerous modifications and substitutions can be made without deviating from the scope of the present invention. For example, in addition to a mouse-over of a primary bookmark causing program 40 to request the corresponding alternate bookmarks, if the user positions a keyboard cursor under keyboard control over a primary bookmark, but does not select the primary bookmark within the predetermined time, web browser 30 will notify program 40 to request the alternate bookmarks. Processing continues thereafter as described above to render and display the list of alternate bookmarks received from the web server. Therefore, the present invention has been disclosed by way of illustration and not limitation, and reference should be made to the following claims to determine the scope of the present invention.

The invention claimed is:

1. A method for managing a primary bookmark for a primary uniform resource locator ("URL") addressing a server application to elicit a primary web page from the server application, the method comprising the steps of:

in response to a user hovering a cursor over the primary bookmark displayed on a client computer, the client computer automatically appending a suffix to the primary URL to address a program function in the server which identifies alternate bookmarks to the primary bookmark identified by the primary URL, the alternate bookmarks representing alternate URLs which elicit respective web pages having respective contents which are different than content of the primary web page, and sending the primary URL with the appended suffix to the server to request the server to return the alternate bookmarks; and in response to receipt of the alternate bookmarks from the server, the client computer displaying the alternate bookmarks adjacent to the primary bookmark.

2. The method of claim 1 further comprising the subsequent steps of:

a user selecting one of the alternate bookmarks which is displayed, and in response, the client computer sending a request to a server corresponding to the selected alternate bookmark for a web page corresponding to the selected alternate bookmark, and in response to receipt of the web page corresponding to the selected alternate bookmark, the client computer displaying the web page.

3. The method of claim 1 further comprising the prior step of the user opening a pull-down menu to reveal the primary bookmark and other primary bookmarks in a list.

4. The method of claim 1 further comprising the step of the server dynamically determining the alternate bookmarks based on conditions present at approximately a time that the server receives from the client computer the primary URL with the appended suffix.

5. The method of claim 1 further comprising the steps of:
the server identifying frequently-requested web pages based in part on a number or frequency of web pages requested from the server; and
the server notifying the client computer to make the alternate bookmarks represent the identified web pages.

6. The method of claim 1 further comprising the steps of:
the server identifying high-volume products sold by a company which provides the primary web page, and
the server notifying the client computer to make the alternate bookmarks represent web pages which feature the high-volume products.

7. The method of claim 1 further comprising the step of:
the server identifying seasonal products sold by a company which provides the primary web page, the seasonal products being in season to when the requests for the alternate bookmarks is made, and
the server notifying the client computer to make the alternate bookmarks represent web pages which featured the seasonal products.

8. The method of claim 1 further comprising the steps of:
the client computer detecting that the user has moved the cursor from the primary bookmark to another primary bookmark displayed on the client computer and hovered the cursor over the other primary bookmark, and in response, the client computer automatically appending the suffix to another primary URL represented by the other primary bookmark to address the program function in the server to request the program function to identify other alternate bookmarks to the other primary bookmark identified by the other primary URL, the other alternate bookmarks representing other alternate URLs which elicit respective other web pages having other respective contents which are different than content of another primary web page represented by the other primary bookmark, and the client computer sending the other primary URL with the appended suffix to the server to request the server to return the other alternate bookmarks; and
in response to receipt of the other alternate bookmarks from the server, the client computer displaying the other alternate bookmarks adjacent to the other primary bookmark.

9. The method of claim 1 wherein the alternate bookmarks represent alternate URLs which elicit respective web pages having respective contents which are substantially different than content of the primary web page.

10. A computer program product for managing a primary bookmark for a primary uniform resource locator ("URL") addressing an application in a server to elicit a primary web page from the server application, the computer program product comprising:

one or more computer-readable tangible storage devices and program instructions stored on at least one of the one or more storage devices, the program instructions comprising:

program instructions, for execution in a client computer, responsive to a user hovering a cursor over the primary bookmark displayed on the client computer, to automatically append a suffix to the primary URL to address a program function in the server which identifies alternate bookmarks to the primary bookmark identified by the primary URL, the alternate bookmarks representing alternate URLs which elicit respective web pages having respective contents which are different than content of the primary web page, and send the primary URL with the appended suffix to the server to request the server to return the alternate bookmarks; and program instructions, for execution in the client computer, responsive to receipt of the alternate bookmarks from the server, to display the alternate bookmarks adjacent to the primary bookmark.

11. The computer program product of claim 10 further comprising:

program instructions, stored on at least one of the one or more storage devices, for execution by the client computer, responsive to a user selecting one of the alternate bookmarks which is displayed, to send a request to a server corresponding to the selected alternate bookmark for a web page corresponding to the selected alternate bookmark, and responsive to receipt of the web page corresponding to the selected alternate bookmark, to display the web page.

12. The computer program product of claim 10 further comprising:

program instructions, stored on at least one of the one or more storage devices, for execution by the client computer, to enable a user to open a pull-down menu and thereby reveal the primary bookmark and other primary bookmarks in a list.

13. The computer program product of claim 10 further comprising:

program instructions, stored on one or more storage devices, for execution by the server, to dynamically determine the alternate bookmarks based on business conditions present at approximately a time that the server receives from the client computer the primary URL with the appended suffix.

14. The computer program product of claim 10 further comprising:

program instructions, stored on one or more storage devices, for execution by the server, to identify frequently-requested web pages based in part on a number or frequency of web pages requested from the server, and notify the client computer to make the alternate bookmarks represent the identified web pages.

15. The computer program product of claim 10 further comprising:

program instructions, stored on one or more storage devices, for execution by the server, to identify high-volume products sold by a company which provides the primary web page, and notify the client computer to make the alternate bookmarks represent web pages which feature the high-volume products.

16. The computer program product of claim 10 further comprising:
program instructions, stored on one or more storage devices, for execution by the server, to identify seasonal products sold by a company which provides the primary web page, the seasonal products being in season to when the request for the alternate bookmarks is made, and notify the client computer to make the alternate bookmarks represent web pages which feature the seasonal products.

17. The computer program product of claim 10 wherein:
the appending and sending program instructions detect that the user has moved the cursor from the primary bookmark to another primary bookmark displayed on the client computer and hovered the cursor over the other primary bookmark, and in response, automatically append the suffix to another primary URL represented by the other primary bookmark to address the program function in the server to request the program function to identify other alternate bookmarks to the other primary bookmark identified by the other primary URL, the other alternate bookmarks representing other alternate URLs which elicit respective other web pages having other respective contents which are different than content of another primary web page represented by the other primary bookmark, and the appending and sending program instructions send the other primary URL with the appended suffix to the server to request the server to return the other alternate bookmarks; and
the displaying program instructions, responsive to receipt of the other alternate bookmarks from the server, display the other alternate bookmarks adjacent to the other primary bookmark.

18. The computer program product of claim 10 wherein the alternate bookmarks represent alternate URLs which elicit respective web pages having respective contents which are substantially different than content of the primary web page.

19. A computer system for managing a primary bookmark for a primary uniform resource locator ("URL") addressing an application in a server to elicit a primary web page from the server application, the computer system comprising:
one or more processors, one or more computer-readable memories, one or more computer-readable tangible storage devices, and program instructions stored on at least one of the one or more storage devices for execution by at least one of the one or more processors via at least one of the one or more memories, the program instructions comprising:
program instructions, for execution in a client computer, responsive to a user hovering a cursor over the primary bookmark displayed on the client computer, to automatically append a suffix to the primary URL to address a program function in the server which identifies alternate bookmarks to the primary bookmark identified by the primary URL, the alternate bookmarks representing alternate URLs which elicit respective web pages having respective contents which are different than content of the primary web page, and send the primary URL with the appended suffix to the server to request the server to return the alternate bookmarks; and program instructions, for execution in the client computer, responsive to receipt of the alternate bookmarks from the server, to display the alternate bookmarks adjacent to the primary bookmark.

20. The computer system of claim 19 further comprising:
program instructions, stored on one or more storage devices for execution by at least one of the one or more processors via at least one of the one or more memories, for execution by the server, to identify frequently-requested web pages based in part on a number or frequency of web pages requested from the server, and notify the client computer to make the alternate bookmarks represent the identified web pages.

21. The computer system of claim 19 further comprising:
program instructions, stored on one or more storage devices for execution by at least one of the one or more processors via at least one of the one or more memories, for execution by the server, to identify high-volume products sold by a company which provides the primary web page, and notify the client computer to make the alternate bookmarks represent web pages which feature the high-volume products.

22. The computer system of claim 19 further comprising:
program instructions, stored on one or more storage devices for execution by at least one of the one or more processors via at least one of the one or more memories, for execution by the server, to identify seasonal products sold by a company which provides the primary web page, the seasonal products being in season to when the request for the alternate bookmarks is made, and notify the client computer to make the alternate bookmarks represent web pages which feature the seasonal products.

23. The computer system of claim 19 wherein the alternate bookmarks represent alternate URLs which elicit respective web pages having respective contents which are substantially different than content of the primary web page.

24. A computer program product for managing a primary bookmark for a primary uniform resource locator ("URL") addressing an application in a server to elicit a primary web page from the server application, the computer program product comprising:
one or more computer-readable tangible storage devices and program instructions stored on at least one of the one or more storage devices, the program instructions comprising:
program instructions, for execution in a client computer, responsive to a user hovering a cursor over the primary bookmark displayed on the client computer, to automatically append a suffix to the primary URL to address a program function in the server which identifies alternate bookmarks to the primary bookmark identified by the primary URL, the alternate bookmarks representing alternate URLs which elicit respective web pages, and send the primary URL with the appended suffix to the server to request the server to return the alternate bookmarks; and
program instructions, for execution in the client computer, responsive to receipt of the alternate bookmarks from the server, to display the alternate bookmarks.

25. The computer program product of claim 24 wherein the alternate bookmarks represent alternate URLs which elicit respective web pages having respective contents which are different than content of the primary web page.

* * * * *